US007963837B2

(12) United States Patent
Moody

(10) Patent No.: US 7,963,837 B2
(45) Date of Patent: Jun. 21, 2011

(54) STUD POKER GAMES

(75) Inventor: Ernest W. Moody, Las Vegas, NV (US)

(73) Assignee: Ernest Moody Revocable Trust, Las Vegas, NV (US)

( * ) Notice: Subject to any disclaimer, the term of this patent is extended or adjusted under 35 U.S.C. 154(b) by 1006 days.

(21) Appl. No.: 11/637,430

(22) Filed: Dec. 11, 2006

(65) Prior Publication Data

US 2007/0135197 A1 Jun. 14, 2007

Related U.S. Application Data

(60) Provisional application No. 60/750,018, filed on Dec. 12, 2005.

(51) Int. Cl.
*G06F 17/00* (2006.01)

(52) U.S. Cl. .......................................................... 463/13

(58) Field of Classification Search .................... 463/12, 463/13; 273/274, 292, 309
See application file for complete search history.

(56) References Cited

U.S. PATENT DOCUMENTS

| | | | | |
|---|---|---|---|---|
| 5,816,915 | A * | 10/1998 | Kadlic | 463/13 |
| 6,135,882 | A * | 10/2000 | Kadlic | 463/13 |
| 6,146,271 | A * | 11/2000 | Kadlic | 463/13 |
| 6,358,144 | B1 * | 3/2002 | Kadlic et al. | 463/13 |

* cited by examiner

*Primary Examiner* — Ronald Laneau
(74) *Attorney, Agent, or Firm* — John Edward Roethel

(57) ABSTRACT

A stud poker game in which a partial hand of cards are dealt as the player's hand. The player is then permitted to choose one of the undealt cards to be added to the player's hand. The remaining cards needed to complete the player's final hand are dealt. If the player has achieved a winning card combination on his final hand, the player receives an award. The award is based on the poker hand ranking of the final player's hand and the amount wagered by the player.

1 Claim, 3 Drawing Sheets

STUD POKER GAMES

CROSS-REFERENCE TO RELATED APPLICATION

This application is based on and claims the benefit of U.S. Provisional Application Ser. No. 60/750,018, filed Dec. 12, 2005, entitled "Stud Poker Games."

This invention relates primarily to video stud poker games, and more particularly to video stud poker games that are programmed to play on an electronic video poker machine. At a certain point in the display of cards to the player, the player is allowed to choose any undealt card to be added to his hand.

BACKGROUND OF THE INVENTION

Video poker that is played on an electronic video poker gaming machine is designed to replicate the play of a hand of poker. Typically, the player is not playing against any other player's hands or against a dealer's hand; the player is simply attempting to achieve the highest ranking poker hand possible from the cards displayed to the player. The higher the ranking of the poker hand achieved by the player, the greater the player's winnings based on the number of coins, tokens or credits wagered by the player. Typically, a payout schedule is posted on the gaming machine to advise the player of the payoffs available for certain winning card combinations.

Five card, six card and seven card stud have been played for many years, usually in a poker room setting in which a plurality of players play against each other striving to obtain the highest ranking poker hand (or lowest ranking poker hand in Lo-Ball poker) in order to win the pot which comprises the wagers made by the players during the play of the game.

There have been attempts to adapt stud poker to an electronic video game format. One attempt involved a single player seven card stud game in which the player makes a first wager and initially received three cards face up. In one version of this game, the player has the option of making additional wagers before the player receives the fourth, fifth, sixth and seventh cards. In another version, the player also has the option of making additional wagers before receiving the fourth, fifth, sixth and seventh cards unless the player has already achieved a winning poker hand combination, in which case the player is not allowed to make additional wagers. In either version, the final seven cards are analyzed and the best five card hand is used to determine the poker hand ranking of the player's hand. A pay table is used based on five card poker hand rankings and the amount wagered by the player to determine the amount won by the player when he achieves a winning hand.

Another popular single player stud poker game is known as DOUBLE DOWN STUD poker. This game is described in U.S. Pat. No. 5,100,137 and U.S. Pat. No. 5,167,413, the disclosures of each of which are incorporated herein by this reference. In DOUBLE DOWN STUD poker, the player makes a first wager and is dealt four cards all face up. The player may make an additional wager prior to receiving the fifth card. After the fifth card is dealt, the five card hand is compared to a pay table to determine if the player has a winning or losing card combination based on poker hand ranking.

Another stud poker game that has been adapted to a single player video poker format is a game known as LET IT RIDE. In this game, the player makes a wager of three units at the start of each round of play. The player is then shown three cards face up. The player may decrease his wager by one unit or let all three wagers ride. The player is then shown a fourth card. The player may decrease his wager by one unit or let his wagers ride. The player is then shown a fifth card and the poker hand ranking of the final five card hand is used to determine winning or losing plays based on a pay table. The method of play of LET IT RIDE is described in U.S. Pat. No. 5,288,081, U.S. Pat. No. 5,417,430 and U.S. Pat. No. 5,544,892, the disclosures of which are incorporated herein.

In video stud poker game, the conventional poker hand rankings that are winning combinations are a Royal Flush, a Straight Flush, a Four of a Kind, a Full House, a Flush, a Straight, a Three of a Kind, a Two Pair and a Pair of Jacks or Better. A payout table is established based on the number of coins wagered by the player and the type of poker hand achieved.

These stud poker games have been modified to use Jokers as wild cards or to use Deuces (or even other cards) as wild cards. "Jokers Wild" and "Deuces Wild" use payout tables that are modified to recognize the differing odds for achieving various poker hands when wild cards are involved. Furthermore, different poker hand rankings are used in the pay table to recognize different winning combinations that can be achieved using wild cards.

There are many poker formats used in video poker. These poker game formats include Jacks (or even Tens or Sixes) or Better Poker, Bonus Poker, Double Bonus Poker, Double Double Bonus Poker, Super Double Bonus Poker, Triple Bonus Poker, Deuces Wild Poker, Jokers Wild Poker, Deuces and Jokers Wild Poker, etc. Many electronic video poker gaming machines are provided with a menu so that the player can indicate his choice of the poker game format that the player wishes to play and the player then makes his wager based on upon that choice of poker game format. Each poker format has its own pay table associated therewith.

SUMMARY OF THE INVENTION

The present invention is a stud poker game in which a partial hand of cards are dealt as the player's hand. The player is then permitted to choose one of the undealt cards to be added to the player's hand. The remaining cards needed to complete the player's final hand are dealt. If the player has achieved a winning card combination on his final hand, the player receives an award. The award is based on the poker hand ranking of the final player's hand and the amount wagered by the player.

DETAILED DESCRIPTION OF THE PREFERRED EMBODIMENTS

Figure 1:
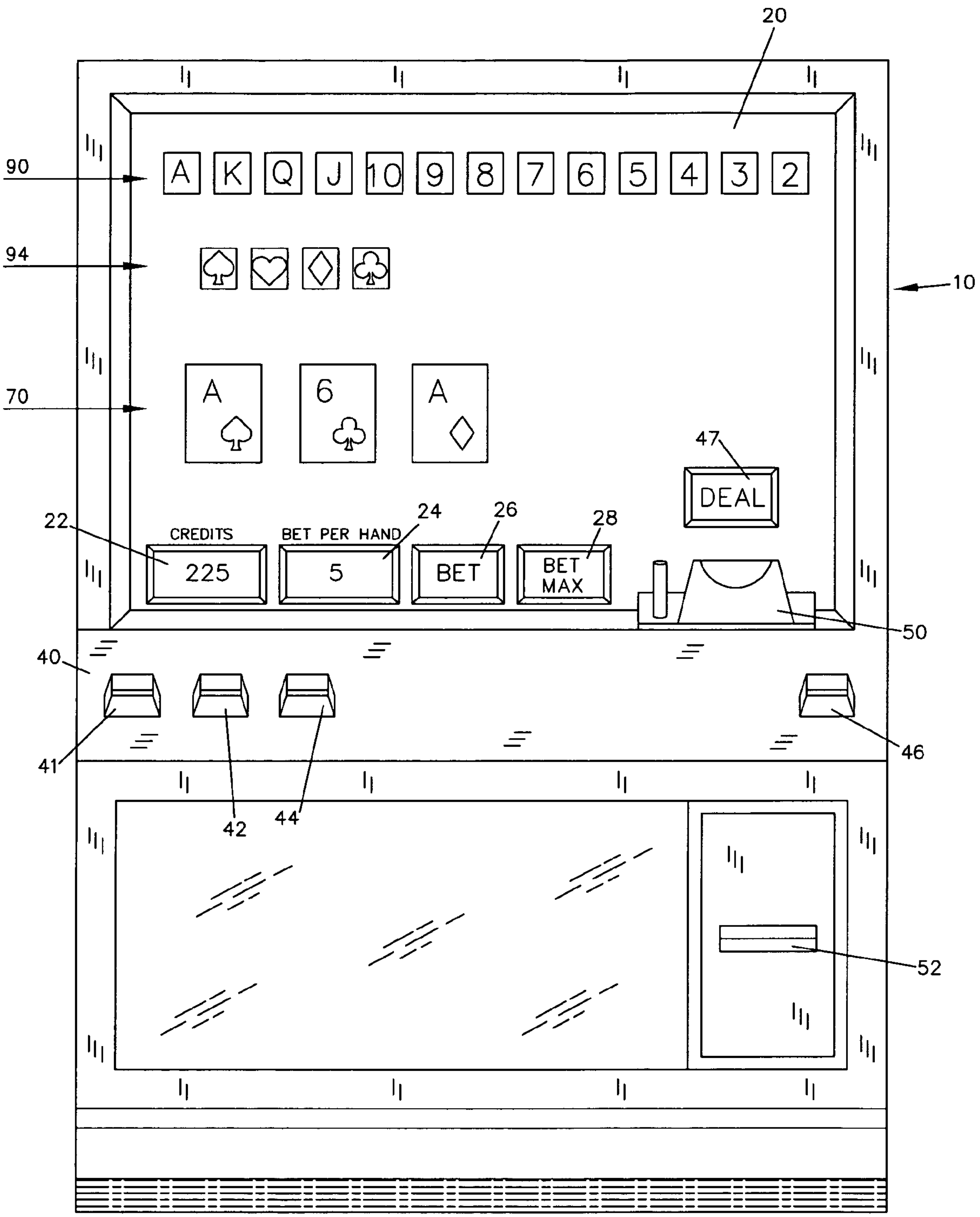
FIG. 1 shows a representative electronic video gaming machine of the present invention including a typical screen display used in the method of play of version #1 of the present invention after the initial deal of the cards.

The method of the present invention can be applied to any poker format used for video poker. FIG. 1 shows generally at 10 a typical electronic video gaming machine that is configured to provide to the player the method of the present invention. The electronic video gaming machine 10 includes a conventional coin head 50 into which the player can insert coins or gaming tokens and a slot 52 which leads to a conventional bill acceptor mounted on the interior of the gaming machine and into which the player can insert paper currency. The use of coins, tokens or paper currency is the mechanism by which the player wagers on the poker hands the player wishes to play. As is also conventional in electronic video gaming machines, a credit meter display 22 is provided to show the amount of credits that the player has accrued on the gaming machine 10—either by inserting coins, tokens or paper currency or from winning plays achieved by the player. Whenever the player makes a wager, the amount of the wager is decremented from the credit meter display 22. Whenever the player achieves a winning play during the play of the game, the amount of the winning play is incremented on the credit meter display 22. In a preferred embodiment of the present invention, the credit meter display 22 is shown on the video screen display 20, although other suitable locations on the gaming machine can be used at which the credit meter display can be shown.

A conventional payout hopper is also located on the interior of the gaming machine and is used to dispense coins or tokens to the player into a payout tray 56 when the player wishes to collect any winning amounts the player has accrued. Other suitable and conventional payout mechanisms can be used, such as a ticket printer or other cashless payout devices.

The gaming machine 10 also includes a video screen display 20 of any suitable type upon which representations of playing cards are displayed. The video screen display 20 can also show other information suitable for the play of the game. In a preferred embodiment of the present invention, the video screen display 20 can be a conventional touch screen configuration which allows the player to perform certain method of play operations by merely touching the appropriate location on the screen.

In a preferred embodiment of the present invention, a player hand 70 is displayed on the video screen display 20. Also displayed are two card selection groups: rank group 90 displays the various card ranks from Ace through Deuce and suit group 94 displays the various suit ranks of Spades, Hearts, Diamonds and Clubs.

The video screen display 20 also contains a location at which the amount wagered on each hand is shown, for example, “Bet Per Hand” 24. In a preferred embodiment of the present invention, the “Bet Per Hand” 24 is shown on the video screen display 20, although other suitable locations on the gaming machine can be used at which the “Bet Per Hand” 24 can be shown.

A button panel 40 is also provided on the gaming machine 10 and the buttons mounted on the button panel 40 are used by the player to control the operation of the gaming machine 10. Any suitable configuration of the buttons on the button panel can be used and, alternatively, conventional touch screen technology can be used for any or all of the buttons mounted on the button panel.

A typical button arrangement is shown on the button panel 40 in FIG. 1. A “BET ONE” button 42 is provided to allow the player to wager one credit at a time. A “BET MAX” button 44 is provided to allow the player to wager the maximum amount of credits permitted by the configuration of the gaming machine 10. Any number of credits can be set as the maximum amount that it is possible to wager on each hand and, typically, five credits will be the maximum number of credits for any particular hand. Alternatively, a BET ONE location 26 and a BET MAX location 28 can be provided on the video screen display 20 to allow the player to wager by using conventional touch screen technology.

A conventional “DEAL” button 46 is also provided on the button panel 40 which is used by the player to activate the initial deal of the cards at the deal stage of the method of play or the dealing of additional cards at the additional card stage of the method of play as is appropriate. Similarly, a DEAL location 47 can be provided on the video screen display 20 to allow the player to effect the deal steps by using conventional touch screen technology.

The method of play of the various versions of the present invention will now be described. After the player has inserted an appropriate amount of coins, tokens or paper currency to add a sufficient amount of credits on the credit display meter 22, the player makes his initial wager. The player may press the BET ONE button 42 one or more times to bet in single increments or the player may merely press the “BET MAX” button 44 and the maximum number of credits are applied, for example, five credits would be wagered. The player can also use the touch screen locations to make his wager as described above.

Version #1

This version of the present invention is played using a standard fifty-two card deck of playing cards. The player makes a wager to participate in the method of play. The game format being played in the example described below is Jacks or Better Seven Card Stud poker. Winning hand combinations are determined by the best five card poker hand ranking from a total final hand having seven cards.

An initial partial hand of three cards is initially dealt and displayed to the player. If the game is being played in a live table game format using a dealer, the deck of playing cards are shuffled to effect a random arrangement of the cards prior to the start of the hand. Then the initial partial hand is dealt by the dealer and displayed to the player on the gaming table. Preferably the cards are dealt face up, although the cards could also be dealt face down to the player if desired.

If the game is being played on an electronic gaming machine, the computer controls of the electronic gaming machine effect a shuffle of the deck of playing cards to create a random arrangement of the playing cards prior to the start of the game. This electronic shuffle is conventional and well known in the art. Then the initial partial hand is dealt and displayed to the player on the video screen display as shown in FIG. 1.

For example, as shown in FIG. 1, the player has received the Ace of Spades, the Six of Clubs and the Ace of Diamonds as the initial partial hand in the player’s hand 70.

The player now chooses a specific card to be added to his hand. This card is chosen from the remaining depleted deck of playing cards representing the original full deck of cards less the cards displayed as the initial partial hand.

In the live table game format, the player makes this choice of a specific card by announcing to the dealer which card the player wishes to have added to his hand. The dealer extracts that card from the remaining depleted deck of playing cards and deals that card to the player.

In the electronic game format of the present invention, the player makes this choice of the desired playing card by touching the associated rank group 90 and suit group 94 on the video screen display 20 corresponding to the specific card the player wishes to choose. The specific card chosen by the player is then displayed into the player’s hand 70.

Figure 2:
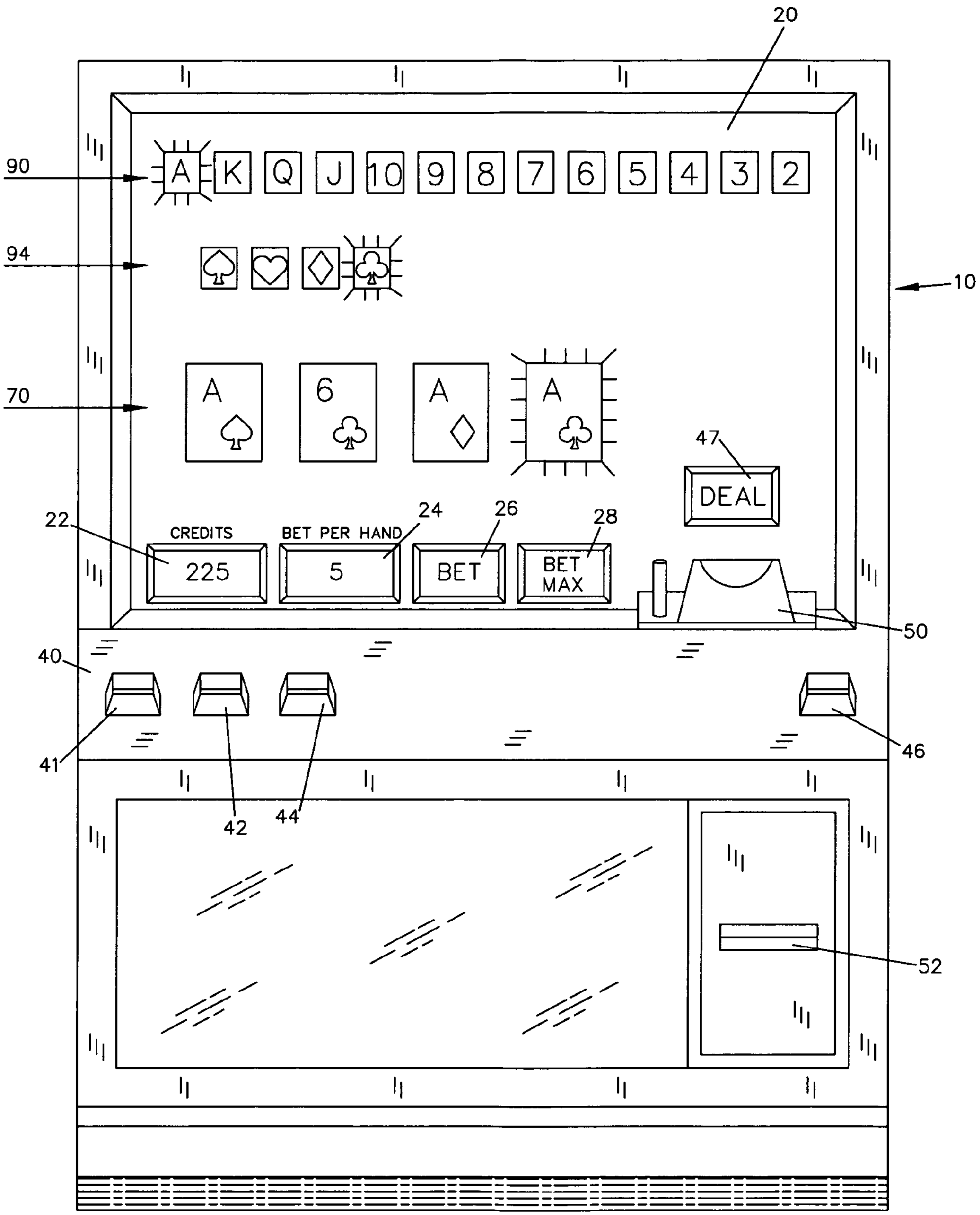
FIG. 2 shows a representative electronic video gaming machine of the present invention including a typical screen display used in the method of play of version #1 of the present invention after the player card selection step.

For example, the player would touch the Ace in rank group 90 and by touching the Club in the suit group 94 as shown in FIG. 2. The Ace of Clubs is added to the player's hand 70. Alternatively, the button panel 40 could be configured to allow the player to make this card selection by pressing one or more buttons on the button panel 40 instead of using touch screen technology on video screen display 20.

After the player's chosen card is added to his hand, the additional cards necessary to complete the final player's hand are added. In the live table game format, the dealer would deal to the player, from the further depleted deck, the cards necessary to complete the final player's hand. The further depleted deck is the original deck of playing cards less the initially dealt cards and the card chosen by the player.

In the electronic game format, the computer controls deal and display the cards necessary to complete the final player's hand from the further depleted deck.

The final player's hand is analyzed to determine whether the final player's hand comprises a winning card combination. Preferably, the winning card combinations have been predetermined and are based on poker hand rankings.

Figure 3:
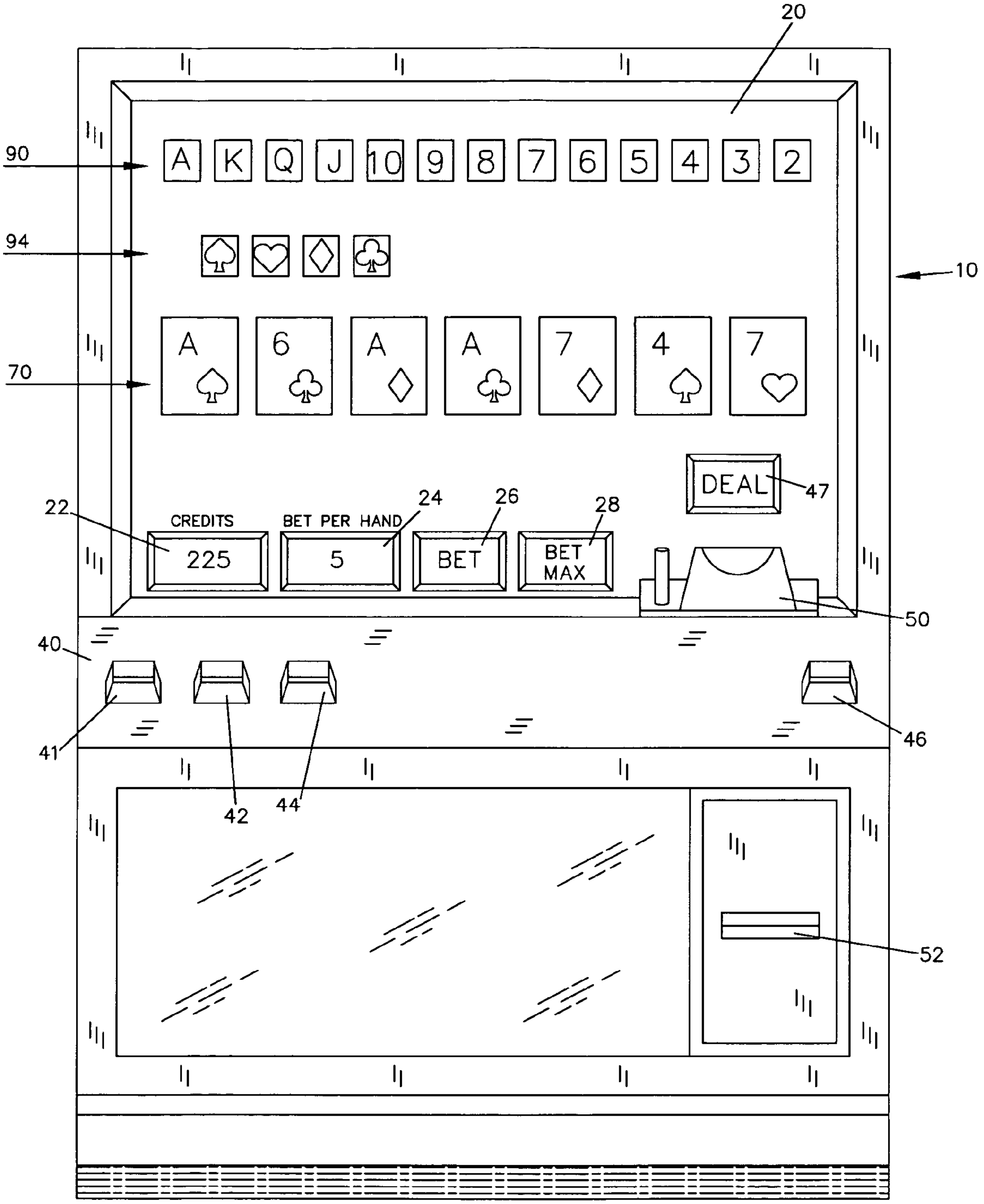
FIG. 3 shows a representative electronic video gaming machine of the present invention including a typical screen display used in the method of play of version #1 of the present invention after the final cards are dealt to complete the final player's hand.

For example, the player's hand is completed as shown in FIG. 3. The player receives three more cards—the Seven of Diamonds, the Four of Spades and the Seven of Hearts. In this example, the best five card poker hand ranking of the seven total cards of the final player's hand is used as is typical in Seven Card Stud Poker. Since the format being used in this example is Jacks or Better Seven Card Stud poker, the player has achieved a Full House as the highest poker hand ranking of the final player's hand.

If the player has achieved a winning card combination, the player receives an award. The award can be based on a pay table which shows award amounts based on the poker hand ranking of the winning card combination and the amount wagered by the player.

Any suitable pay table may be used and would be associated with the poker format being used by the player. For example, the classic poker hand format is Jacks or Better Poker. A suitable pay table for Jacks or Better Poker is shown in Table 1:

TABLE 1

JACKS OR BETTER DRAW POKER

| | NUMBER OF COINS WAGERED | | | | |
|---|---|---|---|---|---|
| POKER HAND RANKING | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR-OF-A-KIND | 25 | 50 | 75 | 100 | 125 |
| FULL HOUSE | 8 | 16 | 24 | 32 | 40 |
| FLUSH | 5 | 10 | 15 | 20 | 25 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

Using the pay table shown in Table 1, for achieving a Full House, the player would receive an award of 40 credits if the player had made a five credit wager.

Other variations of this Version #1 would have the player choose the second card, or third card or fifth card as the player chosen card. Another variation is that the player must make an additional wager to be able to choose the player chosen card. If the player declines to make this additional wager, then the player receives a randomly selected card rather than a player chosen card.

Version #2

This version #2 is played similarly to version #1 except that the final player's hand is a six card hand. The player chosen card could be the second card, the third card, the fourth card or the fifth card. Another variation is that the player must make an additional wager to be able to choose the player chosen card. If the player declines to make this additional wager, then the player receives a randomly selected card rather than a player chosen card.

Version #3

Either Version #1 or Version #2 could be modified by allowing the player to choose more than one player chosen card.

Any of the versions of the present invention can be played using one or more Jokers added to the standard deck of playing cards with the Jokers being wild as is conventional. Also, one or more ranks of cards may be designated as wild cards as is also conventional.

The pay table is adjusted to accommodate the various probabilities associated with the poker format being used and whether wild cards are being used.

The pay table is also adjusted to accommodate the various probabilities for the variations discussed in connection with Version #1, Version #2 and Version #3.

Any of the many poker formats that are used in video poker can be used with any of the versions of the present invention. These poker game formats include Jacks (or even Tens or Sixes) or Better Poker, Bonus Poker, Double Bonus Poker, Double Double Bonus Poker, Super Double Bonus Poker, Triple Bonus Poker, Deuces Wild Poker, Jokers Wild Poker, Deuces and Jokers Wild Poker, etc. Many electronic video poker gaming machines are provided with a menu so that the player can indicate his choice of the poker game format that the player wishes to play and the player then makes his wager based on upon that choice of poker game format. Each poker format has its own pay table associated therewith. As shown in FIG. 1, the gaming machine 10 can be provided with a menu button 41 that will bring up a menu screen at which the player can select which poker format the player wishes to use.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of playing a stud poker game comprising:

a) displaying an initial partial hand to a player from a deck of randomly arranged playing cards;

b) the player choosing a specific card from the remaining depleted deck of playing cards and displaying the specific card in the player's hand;

c) displaying additional cards from the remaining further depleted deck of playing cards to complete a final player's hand; and d) making an award to the player if the final player's hand comprises a winning card combination.

* * * * *